US009902056B2

(12) United States Patent
Kaupp

(10) Patent No.: US 9,902,056 B2
(45) Date of Patent: Feb. 27, 2018

(54) HANDHELD WORK APPARATUS

(71) Applicant: Andreas Stihl AG & Co. KG, Waiblingen (DE)

(72) Inventor: Klaus Kaupp, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 423 days.

(21) Appl. No.: 14/746,565

(22) Filed: Jun. 22, 2015

(65) Prior Publication Data
US 2015/0367496 A1 Dec. 24, 2015

(30) Foreign Application Priority Data

Jun. 20, 2014 (DE) ........................ 10 2014 009 144

(51) Int. Cl.
*B25F 5/02* (2006.01)
*B23Q 11/00* (2006.01)
*B27B 17/00* (2006.01)

(52) U.S. Cl.
CPC ............ *B25F 5/02* (2013.01); *B23Q 11/0089* (2013.01); *B27B 17/00* (2013.01)

(58) Field of Classification Search
CPC ... B23Q 11/0089; B25F 5/02; B27B 17/0008; H01H 3/20
See application file for complete search history.

(56) References Cited

U.S. PATENT DOCUMENTS

| 5,065,476 | A | * | 11/1991 | Dohse | B24B 23/00 16/422 |
|---|---|---|---|---|---|
| 5,212,886 | A | * | 5/1993 | Tasaki | B27B 17/00 30/381 |
| 5,215,049 | A | * | 6/1993 | Wolf | B27B 17/0008 123/179.16 |
| 6,108,916 | A | * | 8/2000 | Zeiler | B27B 5/29 30/375 |
| 8,198,560 | B2 | * | 6/2012 | Kimata | H01H 3/20 200/318.1 |
| 9,330,858 | B2 | * | 5/2016 | Boeck | B24B 23/028 |
| 9,636,792 | B2 | * | 5/2017 | Mandalka | B23Q 11/0089 |
| 2010/0175972 | A1 | * | 7/2010 | Kimata | H01H 3/20 200/318.1 |

(Continued)

FOREIGN PATENT DOCUMENTS

EP 2 607 027 A2 6/2013

*Primary Examiner* — Andrew M Tecco
(74) *Attorney, Agent, or Firm* — Walter Ottesen, P.A.

(57) ABSTRACT

A work apparatus has a motor for driving a tool, an operator-controlled element for the motor and a blocking device. The blocking device has an actuating element having a blocking position and an unblocking position. The operator-controlled element is blocked for the operation of the drive motor when the actuating element is in its blocking position. When shifted from the blocking position into the unblocking position, the actuating element is moved in a first direction and in a second direction. The first direction is into the housing part and the second direction runs perpendicular hereto. A compulsory guide is configured to, during movement of the actuation element in the second direction from the blocking position in a direction toward the unblocking position, initially move the actuation element in a direction opposite to the first direction before the actuation element can be moved in the first direction.

13 Claims, 3 Drawing Sheets

(56) References Cited

U.S. PATENT DOCUMENTS

2013/0161166 A1* 6/2013 Esenwein .............. H01H 9/00
                                                    200/329
2014/0174772 A1* 6/2014 Mandalka ............... B25F 5/02
                                                      173/1
2014/0370792 A1* 12/2014 Boeck .................. B24B 23/028
                                                    451/359

* cited by examiner

HANDHELD WORK APPARATUS

CROSS REFERENCE TO RELATED APPLICATION

This application claims priority of German patent application no. 10 2014 009 144.9, filed Jun. 20, 2014, the entire content of which is incorporated herein by reference.

BACKGROUND OF THE INVENTION

From United States patent application publication 2014/0174772, a handheld work apparatus, in which a blocking device for the operator-controlled element for operating the drive motor is provided, is known. In order to release the blocking device, it is provided that an actuating element of the blocking device must be pivoted in the peripheral direction of the handle and subsequently pressed into the handle.

SUMMARY OF THE INVENTION

It is an object of the invention to provide a handheld work apparatus having a blocking device which has an advantageous configuration.

The handheld work apparatus of the invention includes: a work tool; a drive motor configured to drive the work tool; an operator-controlled element for operating the drive motor; a blocking device for the operator-controlled element; the blocking device including an actuation element having a blocking position and a unblocking position; the blocking device being configured to block the operator-controlled element from operating the drive motor when the actuation element is in the blocking position; a compulsory guide for shifting the actuation element from the blocking position to the unblocking position; a housing including a housing part; the actuation element being arranged on the housing part; the actuation element being configured so as to require at least a partial movement in a first actuation direction and at least a partial movement in a second actuation direction in order to be shifted from the blocking position to the unblocking position; the first actuation direction being directed into the housing part; the second actuation direction running perpendicular to the first actuation direction; the compulsory guide being configured to, during a movement of the actuation element in the second actuation direction from the blocking position in a direction toward the unblocking position, initially move the actuation element in a direction opposite to the first actuation direction before the actuation element can be moved in the first actuation direction.

According to a feature of the invention, the actuating element, when shifted out of the blocking position into the unblocking position, must be moved at least partially in a first actuation direction and at least partially in a second actuation direction, wherein the first actuation direction is directed into the housing part and the second actuation direction runs perpendicularly to the first actuation direction. It is provided that the forced guidance mechanism or compulsory guide moves the actuating element, in a movement of the actuating element in the second actuation direction out of the blocking position in the direction of the unblocking position, firstly in the opposite direction to the first actuation direction, before the actuating element can be moved in the first actuation direction. The actuating element is thus moved firstly in a direction out of the housing part, before the actuating element can be moved into the housing part. The movement out of the housing part prevents the blocking device from being accidentally shifted into its unblocking position if the operator merely grips the handle.

Advantageously, the movement of the actuating element runs out of the blocking position into the unblocking position in an arc extending in the first actuation direction and in the second actuation direction. The actuating element thus performs no rectilinear movement firstly in the opposite direction, then in the second actuation direction and then in the first actuation direction, but rather an arcuate movement, which in a first region has a proportion in the opposite direction and a further proportion in the second actuation direction and which in a second region has a proportion in the second actuation direction and a further proportion in the first actuation direction. An ergonomic, simple operation is thereby obtained. Advantageously, the operator moves the actuating element substantially in the second actuation direction, and the movement in the opposite direction to the first actuation direction and in the first actuation direction is substantially induced by the forced guidance mechanism. The operator has, in particular, merely to permit the movement in the opposite direction to the first actuation direction by appropriate metering of the actuating force, but does not have to actively pull the actuating element outward in the opposite direction to the actuation direction. Simple operation is thereby achieved.

Advantageously, the path which the actuating element covers when shifted out of the blocking position into the unblocking position in the opposite direction to the first actuation direction is at most as large as the path in the first actuation direction. The actuating element hence stands no farther out of the housing part in the unblocking position than in the blocking position. Advantageously, the path in the first actuation direction is greater than the path in the opposite direction. In particular, the actuating element, in the unblocking position, comes to rest in a housing recess. Advantageously, the actuating element, in the unblocking position, terminates substantially flush with the outer side of the housing part. Given an ergonomic hand position, the actuating element can hence be easily held in the unblocking position.

The actuating element is advantageously disposed on a handle of the work apparatus, and the first actuation direction is directed in the direction of the longitudinal center axis of the handle. Advantageously, the second actuation direction lies parallel to the longitudinal center axis of the handle. However, an orientation of the second actuation direction in the peripheral direction relative to the longitudinal center axis, in particular along the outer side of the handle, can also be advantageous.

Advantageously, the actuating element is a slide bar disposed on the outer side of the handle and extending in the direction of the longitudinal center axis of the handle. In order to enable simple actuation, it is provided that the actuating element possesses a first actuating portion arranged transversely to the first actuation direction and a second actuating portion arranged transversely to the second actuation direction. As a result, both the movement of the actuating element in the first actuation direction and the movement in the second actuation direction are simple and ergonomically possible for the operator.

A simple configuration is obtained if the forced guidance mechanism includes at least one pivot bearing. Advantageously, the forced guidance mechanism includes at least one link guide. However, it can also be provided that the forced guidance mechanism includes two pivot bearings. A configuration including two links guides can also be advantageous. Advantageously, the link guide has an arcuate course. By coordinating the course of the link guides and/or of the lever arm of the pivot bearings, a desired movement of the actuating element can be achieved. It can be advantageous for the actuating element, in different longitudinal portions, to perform differently sized movements in the first and the second actuation direction. An ergonomic actuation can thereby be enabled.

Advantageously, the blocking device includes a blocking contour which prevents an actuation movement of the operator-controlled element in the blocking position of the actuating element and allows it in the unblocking position. The blocking contour is advantageously movably mounted and coupled to the position of the actuating element. The blocking contour is disposed, in particular, on an arm of a pivot bearing of the actuating element. This produces a simple configuration. The blocking contour prevents actuation of the operator-controlled element. However, it can also be provided that the blocking device acts on the transmission of the operating movement of the operator-controlled element to the drive motor and prevents the transmission of the operating movement. It can also be provided that the blocking device works electrically and blocks, for instance, an operation of the drive motor as long as the blocking device is in the blocking position.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
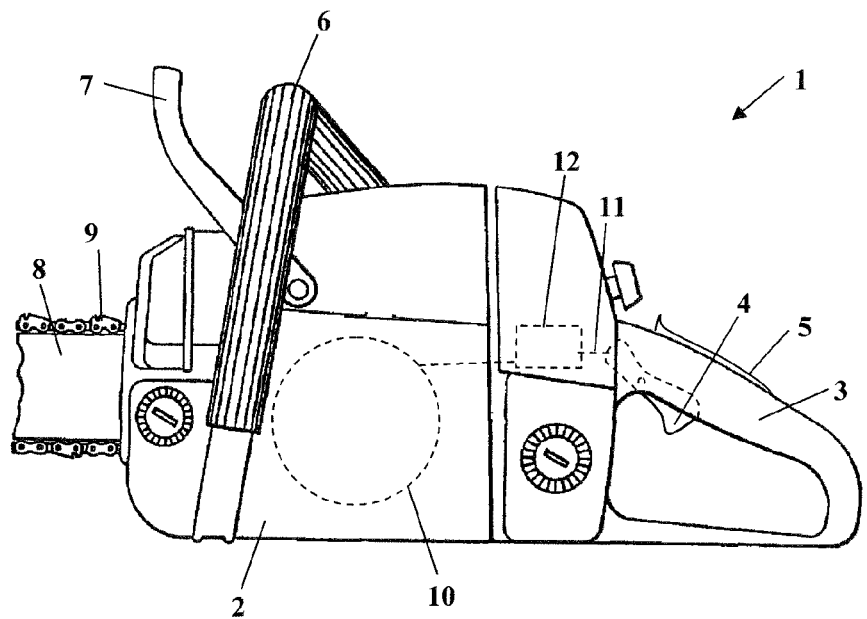
FIG. 1 is a schematic of a chain saw.

FIG. 1 shows a chain saw 1 as an embodiment of a handheld work apparatus. Instead of a chain saw 1, a different handheld work apparatus, such as a cut-off machine, a brushcutter, a hedge trimmer, a blower or the like, can be provided. The chain saw 1 possesses a housing 2, on which a handle 3 is disposed. In the embodiment, the handle 3 is configured as a rear handle. However, the handle 3 can also be an upper handle disposed on the top side of the housing 2. On the handle 3 are arranged an operator-controlled element 4 and an actuating element 5. The operator-controlled element 4 serves to operate a drive motor 10 disposed in the housing 2. In the embodiment, the drive motor 10 is configured as an electric motor, and the operator-controlled element 4 acts on the drive motor 10 via a coupling element 11 and a control device 12. The drive motor 10 can also, however, be a combustion engine. The coupling element 11 can then, for instance, act on a carburetor, which feeds a fuel/air mixture to the combustion engine.

Projecting forward on the front side of the housing 2, which front side faces away from the handle 3, is a guide rail 8, on which a saw chain 9 is revolvingly arranged. This saw chain 9 is driven by the drive motor 10. On the housing 2 is held a handle tube 6, which reaches over the housing 2. A hand guard 7 is arranged on the side of the handle tube 6 which faces the saw chain 9. The hand guard 7 can serve to trigger a braking device for the saw chain 9.

Figure 2:
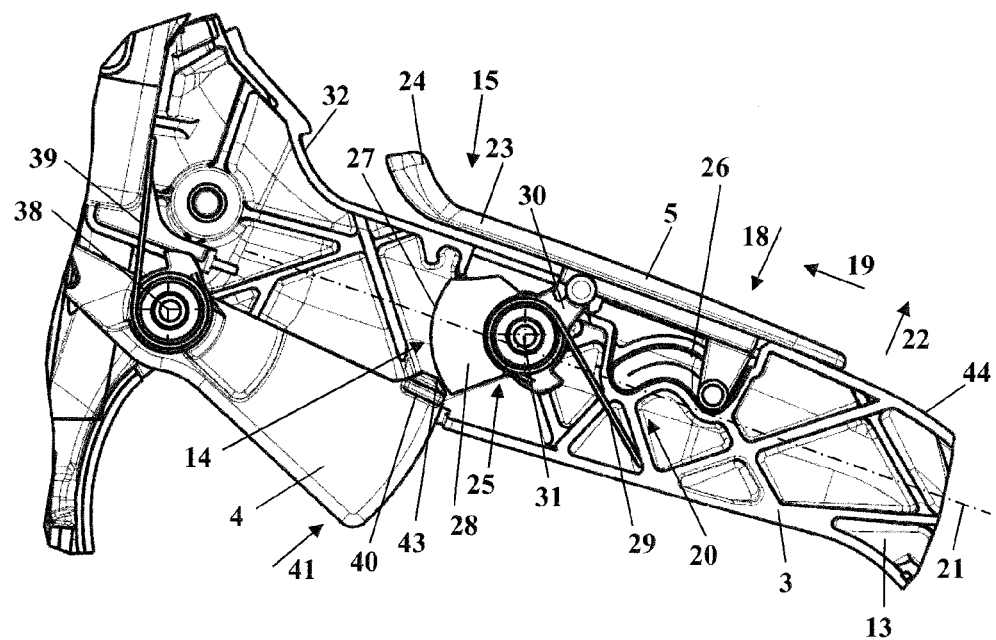
FIG. 2 is a side view of the handle of the chain saw from FIG. 1, a half-shell of the handle having been removed, with the blocking device in the blocking position.

FIG. 2 shows the structure of the handle 3 in detail. The handle 3 is made up of two half shells 13, of which one is shown in FIG. 2. The half shell 13 situated above the plane of the page is removed, so that the mounting of the elements in the handle 3 is visible. The operator-controlled element 4 is mounted in the handle 3 pivotably about a pivot axis 38. The operator-controlled element 4 is spring-loaded into the unactuated position shown in FIG. 2 by a spring 39 which, in the shown embodiment, is configured as a leg spring. For the actuation of the operator-controlled element 4, the operator-controlled element 4 must be pressed in an actuation direction 41, counter to the force of the spring 39, into the handle 3.

As FIG. 2 shows, a blocking device 14 is provided for the operator-controlled element 4. In FIG. 2, the blocking device 14 is shown in a blocking position 15. In the blocking position 15, the operator-controlled element 4 cannot be pivoted in the actuation direction 41, since a blocking contour 27 of the blocking device 14 lies in the pivot path of the operator-controlled element 4. As FIG. 2 shows, the operator-controlled element 4 bears with a stop 43 against the blocking contour 27. Adjacent to the stop 43 is provided a stop 40, which cooperates with the housing of the handle 3 and prevents the spring 39 from being able to push the operator-controlled element 4 further out of the handle 3 than shown in FIG. 2.

The blocking contour 27 is configured on an arm 28 of a pivot lever 30. The pivot lever 30 is part of a pivot bearing 25 with which the actuating element 5 is mounted on the handle 3. The actuating element 5 is configured as a slide bar and is arranged adjacent to an outer side 44 of the handle 3. The actuating element 5 is movably mounted on the handle 3 with the pivot bearing 25 and a link guide 26. The link guide 26 and the pivot bearing 25 form a forced guidance mechanism for the actuating element 5. The link guide 26 is of arcuate configuration. The pivot bearing 25 and the link guide 26 are oriented such that the actuating element 5, in a movement in a second actuation direction 19, firstly moves in an opposite direction 22 out of the handle, before the actuating element 5 can be moved in a first actuation direction 18 in the direction of the handle 3. The first actuation direction 18 is here directed into the handle 3. The handle 3 possesses a longitudinal center axis 21, and the first actuation direction 18 is oriented roughly in the radial direction toward the longitudinal center axis 21. The opposite direction 22 runs out of the handle 3. The second actuation direction 19 runs in the longitudinal direction of the handle 3 and approximately parallel to a longitudinal center axis 21 of the handle 3. In the embodiment, the second actuation direction 19 is here directed in the direction of the housing 2 (FIG. 1) of the chain saw 1. Viewed from the operator, the actuating element 5 can be slid forward in the second actuation direction 19 and, due to the oblique position of the longitudinal center axis 21, upward. However, the second actuation direction 19 can also in the operational position be directed roughly horizontally or downward. An orientation of the second actuation direction 19 in the peripheral direction of the handle 3 can also be advantageous.

As FIG. 2 also shows, the actuating element 5 possesses a first actuating portion 23, which runs roughly parallel to the outer side 44 of the handle 3 and transversely, in the embodiment roughly perpendicularly, to the first actuation direction 18. The actuating element 5 additionally possesses a second actuating portion 24, which is disposed on that side of the actuating element 5 that is facing the housing 2 and lies counter to the second actuation direction 19, and which runs transversely to the second actuation direction 19. In the embodiment, the second actuating portion 24 is configured as an upwardly curved, front border of the actuating element 5. Adjacent to the actuating element 5, the handle 3 possesses a recess 32, which is described in greater detail below.

As FIG. 2 shows, the pivot lever 30 of the pivot bearing 25 is mounted pivotably about a pivot axis 31. By a spring 29, which in the embodiment is configured as a leg spring, the pivot lever 30 is pretensioned in the direction of the position corresponding to the blocking position 15 of the actuating element 5.

Figure 3:
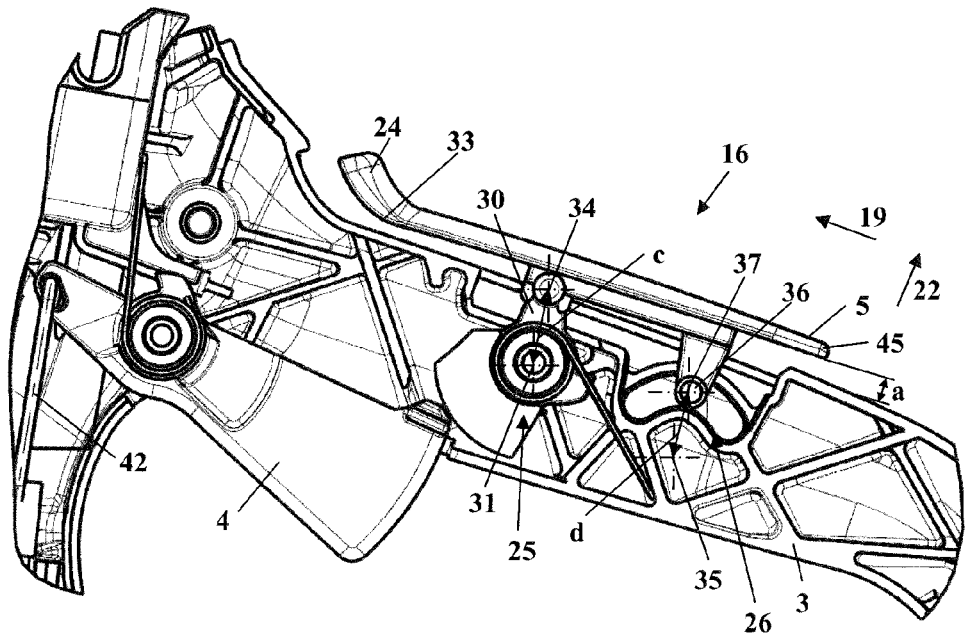
FIG. 3 shows the handle from FIG. 2, with the blocking device in an intermediate position.

FIG. 3 shows the configuration of the pivot bearing 25 and of the link guide 26 in detail. The actuating element 5 has here been shifted in relation to the blocking position 15 shown in FIG. 2 into an intermediate position 16. To this end, the actuating element 5 has been moved in the second actuation direction 19. Due to the forced guidance by the pivot bearing 25 and the link guide 26, the actuating element 5, in the movement in the second actuation direction 19, has simultaneously moved outward away from the handle 3 in the opposite direction 22 to the first actuation direction 18. The actuating element 5 has here moved by a path distance (a) in the opposite direction 22. The path distance (a) is measured at a region 45 of the actuating element 5 which is the region of the actuating element 5 that lies remote from the second actuating portion 24.

As FIG. 3 shows, the actuating element 5 is mounted on the pivot lever 30 pivotably about a pivot axis 34. The pivot axis 34 possesses a distance (c) to the pivot axis 31 of the pivot lever 30. In the link guide 26 is guided a guide bolt 36 of the actuating element 5. The guide bolt 36 possesses a center axis 37.

The link guide 26 is configured as a circular arc portion and possesses a center point 35, which has a distance (d) to the center axis 37. In the embodiment, the distance (d) is smaller than the distance (c). A region 33 of the actuating element 5 that lies remote from the region 45 hence moves a lesser path distance in the opposite direction 22 than does the region 45 of the actuating element 5. In the embodiment shown, the region 33 is the region that is oriented in the forward direction in relation to the operator, and the region 45 is the region of the actuating element 5 that points rearward. As FIG. 3 also shows, a throttle linkage 42 for the operation of the drive motor 10 is provided on the operator-controlled element 4. Instead of a throttle linkage 42, in particular when the drive motor is an electric motor, it is also possible to provide an electric switch on which the operator-controlled element 4 acts. A Bowden cable or the like can also be provided.

Figure 4:
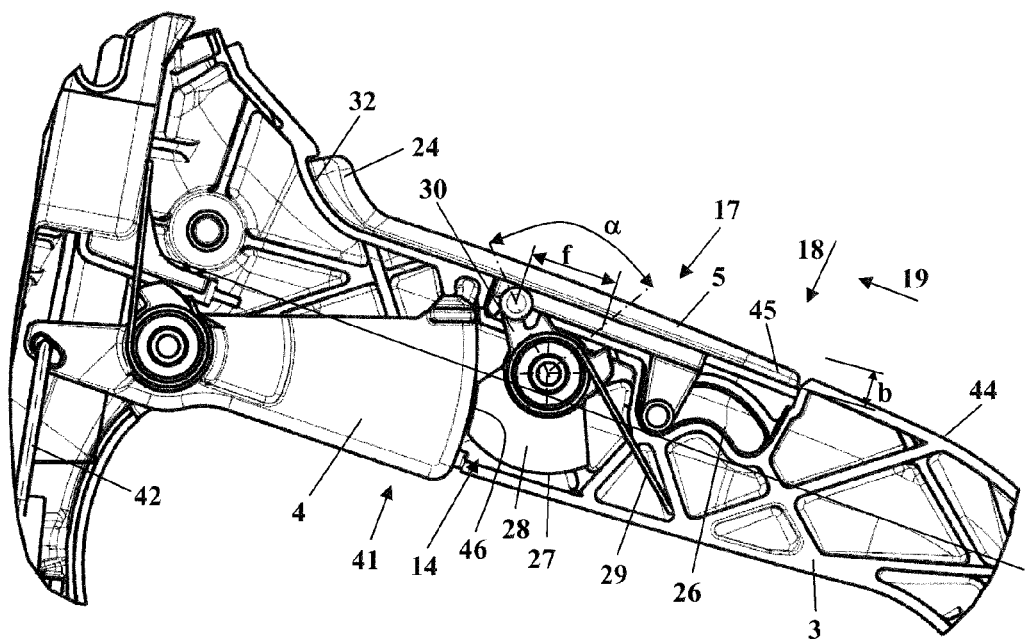
FIG. 4 shows the handle from FIGS. 2 and 3, with the blocking device in the unblocking position; and, FIG. 5 shows the handle, with a construction variant of the blocking device in the unblocking position.

FIG. 4 shows the blocking device 14 in its unblocking position 17. In the unblocking position 17, the blocking contour 27 is pivoted out of the pivot path of the operator-controlled element 4, so that the operator-controlled element 4 can be pressed in the actuation direction 41 into the handle 3. FIG. 4 shows the operator-controlled element 4 in the fully actuated position, that is, in the full throttle position. The operator-controlled element 4 has displaced the gas linkage 42 and thereby actuated the drive motor 10. In relation to the intermediate position shown in FIG. 3, the actuating element 5 has moved further in the second actuation direction 19 and, at the same time, in the first actuation direction 18 in the direction into the handle 3. In the unblocking position 17 shown in FIG. 4, the actuating element 5 lies partially in the recess 32. The region 45 terminates roughly level with the outer side 44 of the handle 3. In relation to the intermediate position 16 shown in FIG. 3, the actuating element 5 has moved in the region 45 by a path distance (b) in the second actuation direction 19, which path distance (a) corresponds at least to the path distance (a) in the opposite direction 22. In the embodiment, the path distance (b) into the recess 32 in the region 45 is greater than the path distance (a). As FIG. 4 also shows, the pivot lever 30 is pivoted in relation to the blocking position 15 (FIG. 2) by an angle α about the pivot axis 31, which advantageously measures from about 45° to about 135°, in particular from about 60° to about 120°. In the embodiment, the angle α is somewhat less than 90°. The pivot lever 30 is here oriented such that the pivot axis 34 moves in the opposite direction 22 until roughly half the pivot path is reached and, once roughly half the pivot path has been negotiated, in a first actuation direction 18. This orientation of the pivot lever 30 also serves to ensure that the path distance (f) which the actuating element 5 performs in the second actuation direction 19 is significantly greater than the path distance (b) which the actuating element 5 performs in the first actuation direction 18. In FIG. 4, the path distance (f) by which the actuating element 5 moves in the second actuation direction 19 is illustrated. If the actuating element 5 is released from the unblocking position 17 shown in FIG. 4, then the spring 29 pushes the actuating element 5 in the direction of the blocking position 15 (FIG. 2). However, the actuating element 5 cannot pivot back, since the operator-controlled element 4 bears against a holding contour 46 of the pivot lever 30. In the embodiment, the holding contour 46 is configured on the arm 28 adjacent to the blocking contour 27. As soon as the operator-controlled element 4 is released by the operator and pivots back into the unactuated position, the actuating element 5 moves back into the blocking position 15 insofar as it is not held by the operator.

Figure 5:
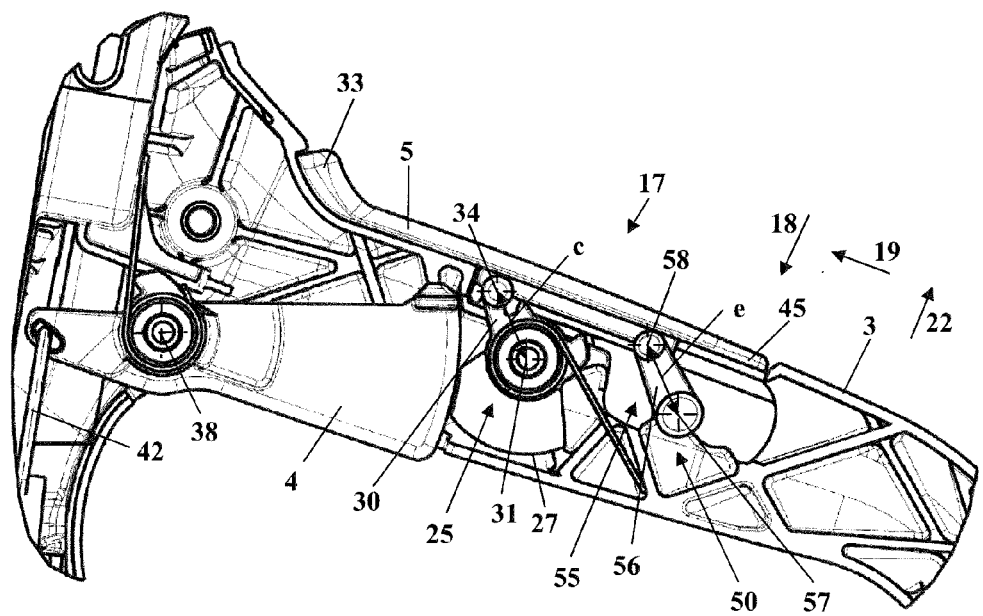

FIG. 5 shows an embodiment of a forced guidance mechanism 50 for the actuating element 5. Corresponding elements are labeled by the same reference symbols as in the preceding figures. The actuating element 5 is mounted with a first pivot bearing 25 and a second pivot bearing 55, which induce an arcuate movement of the actuating element 5. The actuating element 5 here, during the movement out of the blocking position 15 into the unblocking position 17, moves firstly in the opposite direction 22 and in the second actuation direction 19, and then in the first actuation direction 18 and in the second actuation direction 19. The movement here runs in the shape of an arc. The second pivot bearing 55 is provided in place of the link guide 26 of the forced guidance mechanism 20. The second pivot bearing 55 possesses a pivot lever 56, which is mounted on the handle 3 pivotably about a pivot axis 57. On the actuating element 5, the pivot lever 56 is mounted pivotably about a pivot axis 58. The pivot axes 57 and 58 have a distance apart (e). In the embodiment, the distance (e) is equal in size to the distance (c) between the pivot axes 31 and 34 of the pivot bearing 25. As a result, the actuating element 5 performs in its regions 33 and 45 the same arcuate movement. The two pivot levers 30 and 56 are oriented parallel to each other. It can also be provided to provide pivot levers of different length, which are not oriented parallel to each other, in order to obtain different movements in the regions 33 and 45.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
a work tool;
a drive motor configured to drive said work tool;
an operator-controlled element for operating said drive motor;
a blocking device for said operator-controlled element;
said blocking device including an actuation element having a blocking position and an unblocking position;
said blocking device being configured to block said operator-controlled element from operating said drive motor when said actuation element is in said blocking position;
a compulsory guide for shifting said actuation element from said blocking position to said unblocking position;
a housing including a housing part;
said actuation element being arranged on said housing part;
said actuation element being configured so as to require at least a partial movement in a first actuation direction and at least a partial movement in a second actuation direction in order to be shifted from said blocking position to said unblocking position;
said first actuation direction being directed into said housing part;
said second actuation direction running perpendicular to said first actuation direction;
said compulsory guide being configured to, during a movement of said actuation element in said second actuation direction from said blocking position in a direction toward said unblocking position, initially move said actuation element in a direction opposite to said first actuation direction before said actuation element can be moved in said first actuation direction.

2. The handheld work apparatus of claim 1, wherein said actuation element is configured, when being moved from said blocking position to said unblocking position, to travel an arc-shaped path extending in said first actuation direction and said second actuation direction.

3. The handheld work apparatus of claim 1, wherein:
said actuating element, when being shifted from said blocking position to said unblocking position, defines a path (a) in a direction opposite to said first actuation direction and a path (b) in said first actuation direction; and,
said path (a) is at most as long as said path (b).

4. The handheld work apparatus of claim 1 further comprising:
a handle defining a longitudinal center axis;
said actuation element being arranged on said handle; and,
said first actuation direction is directed in a direction toward said longitudinal center axis.

5. The handheld work apparatus of claim 4, wherein said second actuation direction is parallel to said longitudinal center axis.

6. The handheld work apparatus of claim 4, wherein:
said handle has an outer side; and,
said actuation element is a slider arranged on said outer side and extending in the direction of said longitudinal center axis.

7. The handheld work apparatus of claim 1, wherein said actuation element has a first actuation section arranged transverse to said first actuation direction and a second actuation section arranged transverse to said second actuation direction.

8. The handheld work apparatus of claim 1, wherein said compulsory guide includes at least one pivot bearing.

9. The handheld work apparatus of claim 1, wherein said compulsory guide includes at least one link guide.

10. The handheld work apparatus of claim 9, wherein said link guide has an arc-shaped course.

11. The handheld work apparatus of claim 1, wherein said blocking device includes a blocking contour configured to prevent an actuation movement of said operator-controlled element when said actuating element is in said blocking position and to allow an actuation movement of said operator-controlled element when said actuating element is in said unblocking position.

12. The handheld work apparatus of claim 11, wherein said blocking contour is movably supported and is coupled to the position of said actuating element.

13. The handheld work apparatus of claim 12, wherein:
said actuating element includes a pivot bearing having an arm; and,
said blocking contour is arranged on said arm.

* * * * *